Sept. 30, 1958   A. G. BUHR ET AL   2,854,172
FERTILIZER ATTACHMENT

Filed July 5, 1955   3 Sheets-Sheet 1

Inventors
August G. Buhr
Kenneth R. Weber
by T. Lloyd LeFave
Attorney

Sept. 30, 1958     A. G. BUHR ET AL     2,854,172
FERTILIZER ATTACHMENT

Filed July 5, 1955     3 Sheets-Sheet 2

Inventors
August G. Buhr
Kenneth R. Weber
by T. Lloyd La Fave
Attorney

United States Patent Office 2,854,172
Patented Sept. 30, 1958

2,854,172

FERTILIZER ATTACHMENT

August G. Buhr and Kenneth R. Weber, La Crosse, Wis., assignors to Allis-Chalmers Manufacturing Company, Milwaukee, Wis.

Application July 5, 1955, Serial No. 520,045

5 Claims. (Cl. 222—162)

This invention relates to an agricultural implement for distributing material such as lime, chemical fertilizer, and like material. The invention relates more particularly to a fertilizer distributor having an improved mechanism for opening and closing hopper openings.

Valves or gates in the bottom of fertilizer hoppers are adjustable to regulate the flow of fertilizer therethrough. In tractor mounted fertilizer distributors the fertilizer gates or valves may be opened when the implement is lowered relative to the tractor as it is when in a field operating position. The valves are closed when the implement is raised relative to the tractor as it is when supported in a transport position.

Such valves or gates have been subject to jamming, particularly due to leakage of fertilizer and accumulation of such fertilizer between relatively moving parts of the valve mechanism. Means heretofore used for opening and closing the valves comprises complicated linkage which is difficult to service and adjust. The valve and linkage is subject to damage when a foreign object, lump of fertilizer, or caking of fertilizer causes jamming of the valve mechanism preventing it from opening or closing.

It is an object of the present invention to provide a valve mechanism for a fertilizer distributor that will open and close the valve without causing damage to the valve or operating mechanism upon jamming of the valve.

Another object of the invention is to provide a valve mechanism for a tractor propelled fertilizer distributor that automatically will open the valve when the fertilizer distributor is in a working position and automatically close the valve when the fertilizer distributor is in a nonworking position without causing damage to the parts upon jamming of the valve.

Another object of the invention is to automatically close and open a hopper valve to a variable opening.

Another object of the invention is to provide a simple nonbreakable mechanism for operating a valve for a tractor-drawn fertilizer distributor that automatically closes and opens the valve upon raising and lowering, respectively, the fertilizer distributor from and to an implement lowered position relative to the tractor.

Other objects and advantages may be apparent to one skilled in the art from the following description taken with the accompanying drawings, in which.

Figure 1:
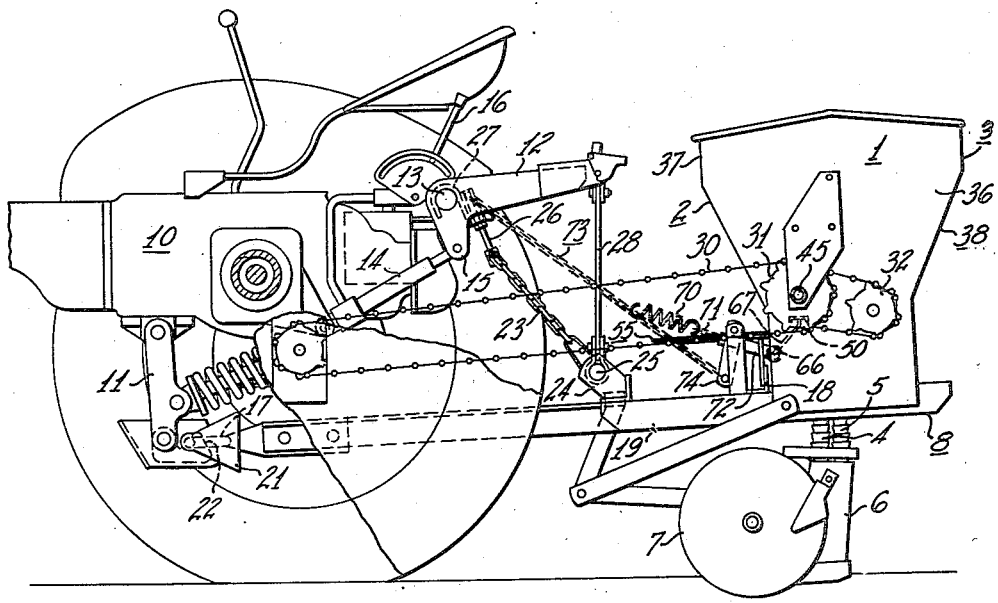
Fig. 1 is a view in side elevation with portions broken away and in section of a tractor mounted grain drill and fertilizer distributor embodying the present invention and shown in implement-lowered field-operating position.

Referring to Fig. 1, an implement 1 such as a drill planter has a container subdivided to provide a fertilizer hopper 2 and a seed hopper 3 sharing common end walls and a partition with each other of the container. Fertilizer hopper 2 receives fertilizer material such as lime to be distributed either broadcast or through a valve associated with the floor or bottom of the hopper to suitable conveying tubes 4 which guide the fertilizer through a boot 6 for depositing the fertilizer on the ground. Boot 6 may be connected to conveying tubes 5 for receiving seed from hopper 3 so that boot 6 deposits both fertilizer and seed side by side in rows made by furrow opening wheel 7 mounted on the implement frame 8 in a known manner.

The implement may be supported by vertically adjustable ground support wheels and propelled by a tractor 10. The implement is preferably supported, however, as shown by tractor 10 during fertilizing and planting and during transport. The tractor 10 has a depending hitch yoke 11 and laterally spaced, vertically swingable power lift arms 12. The power lift arms are secured to a transverse shaft 13 supported for rotation on a rear portion of the tractor.

An actuating mechanism for the power lift arms 12 comprises a conventional servomotor such as a hydraulic ram 14 pivotally supported at one end on the tractor and at the other end on a crank arm 15 or lever on the power lift arm. The hydraulic actuating mechanism also includes a valve, not shown, controlled by a hand lever 16 in such a manner that when the lever 16 is in the position to the right as shown in Fig. 1 the ram will collapse to its fully contracted position, and so that when the lever is moved to the left to the position shown in Fig. 2 pressure fluid acts on the ram piston to raise the power lift arms. Adjustment of lever 16 to its extreme implement lowering position establishes a fully open connection between the cylinder of ram 14 and a reservoir, not shown. As a result, power lift arms will be free to swing up and down without hydraulic restraint when the lever is in a fully lowered position, to the extreme right.

The fertilizer distributor comprises a rigid generally rectangular frame 8 including transverse members 18, side members 19, and hitch angle irons 20 secured to the transverse frame members to form a tongue or draft pole having a coupling eye 17 at its forward end which is detachably latched by a draft hook 22 in a bell housing coupler 21 connected to hitch yoke 11 to provide lateral and vertical swinging movement of the fertilizer distributor about the tractor hitch point defined by the hook and eye coupling.

The hitch structure also includes a pair of laterally spaced chains 23 connected at their lower end to pins 25 secured between bracket plates 24 mounted forwardly on side frame member 19. Chains 23 have their upper ends connected to bolts 26 threaded in hooks 27 which hook upon rock shaft 13 on the tractor.

Figure 2:
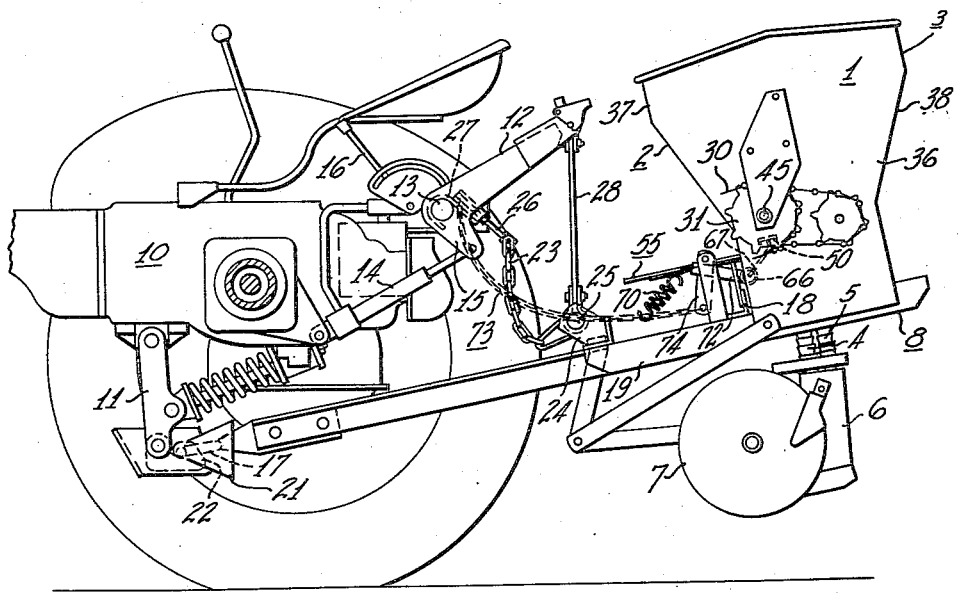
Fig. 2 is another view in side elevation showing the implement of Fig. 1 in raised or transport position.

As shown in Fig. 1, with the draft pole hitched to the tractor, the chains 23 hold the distributor supported in a field operating position, and the distributor can be swung vertically upward about the hitch point from the lowered position determined by the length of chains 23, to a transport position, Fig. 2, by means of the power lift arms 12 which are connected to pins 25 in brackets 24 by rigid links 28.

Rigid links 28 are pivotally connected at their lower end to bracket plates 24, and are pivotally and detachably coupled at their upper ends in a known manner to the free ends of the power lift arms.

The dispensing mechanisms for the fertilizer and seed hoppers receive power from the tractor in a conventional manner, as by a chain 30 connecting a driving member on a wheel of the tractor with a driven sprocket wheel 31 on the fertilizer hopper. The shaft supporting sprocket wheel 31 has another sprocket wheel, not shown, which receives a chain for driving the sprocket wheel 32 operating the seeding mechanism, not shown.

The hopper 2 for the fertilizer distributor has generally downwardly converging front and back sides 37, 38 and end walls 35, 36 suitably supported on the frame 8. A floor or bottom 39 for the hopper has a series of spaced apertures or openings 40 in the bottom for the passage of fertilizer therethrough. An agitator or auger 43 is disposed in the bottom of the hopper and comprises a shaft 44 detachably coupled to a stub shaft 45 extending through an end wall and driven by sprocket wheel 31. Shaft 44 is suitably supported and has spring steel wire helices 47, 48 mounted for rotation with the shaft to force fertilizer toward hopper openings 40. Adjacent helices are left and right hand helices and each is rigidly secured at one end to shaft 44. A radially projecting pin 49 is disposed between helices in alignment with openings 40 to rotate with the shaft and maintain the openings 40 clear of obstructing material.

A valve for regulating flow of fertilizer through opening 40 comprises the bottom 39 of the hopper 2 and a valve plate 50 slidably supported relative to the hopper bottom. Openings 40 have downward extending edges 41 or flanges which space the valve plate from the bottom surface of the hopper.

Valve plate 50 is channel shaped and disposed inverted with its downward turned side edges supported on relatively narrow longitudinally spaced strips secured to the hopper bottom on opposite sides of the valve plate. Guide strips 52 guide and support valve plate 50 for back and forth sliding movement of the valve plate on the hopper bottom.

Valve plate 50 has apertures or openings 53 therein which correspond in size and spacing to the openings 40 in the hopper bottom. Spouts 54 are welded to valve plate 50 to extend openings 53 downward and provide an attachment for the flexible and detachable ribbon tubes 4.

Means are provided for moving valve plate 50 to vary the registration of openings 53 therein with the openings 40 in the bottom of the hopper. Such means may be manual as provided by a control lever so that the control lever swings horizontally left and right about a vertical pivot provided by a bolt 56 securing the lever to a base plate 57 secured to a transverse member of frame 8.

One end 58 of control lever 55 provides a stop 59. A branch arm 60 provides a stop 61 and is rigidly secured to the lever arm so that branch arms 58, 60 define a forked end having stops 59, 61. A downwardly extending flange 62 is secured rigidly to the bottom of valve plate 50 so the flange 62 is disposed between the forked ends of control lever 55 between stops 59, 61. Flange 62 is disposed so that its opposite relatively wide faces are transverse to the longitudinal slide movement of valve plate 50, and lever arms 58 and 60 are notched adjacent the ends so the stops are salient and will only engage flange 62 on its opposite relatively wide faces to transmit only longitudinal force to valve plate 50 upon swinging of control lever 55. Without the notches forming the salient stops, arms 58 and 60 would abut an edge of flange 62 and transmit a force tending to move valve plate laterally and thereby create considerable frictional engagement with guiding strips 52 and cause jamming of the valve plate against longitudinal sliding movement. Control lever 55 may be swung left and right for shaking the valve mechanism when cleaning the hopper of fertilizer so that fertilizer on valve plate 50 under the hopper bottom will readily fall off.

Figure 4:
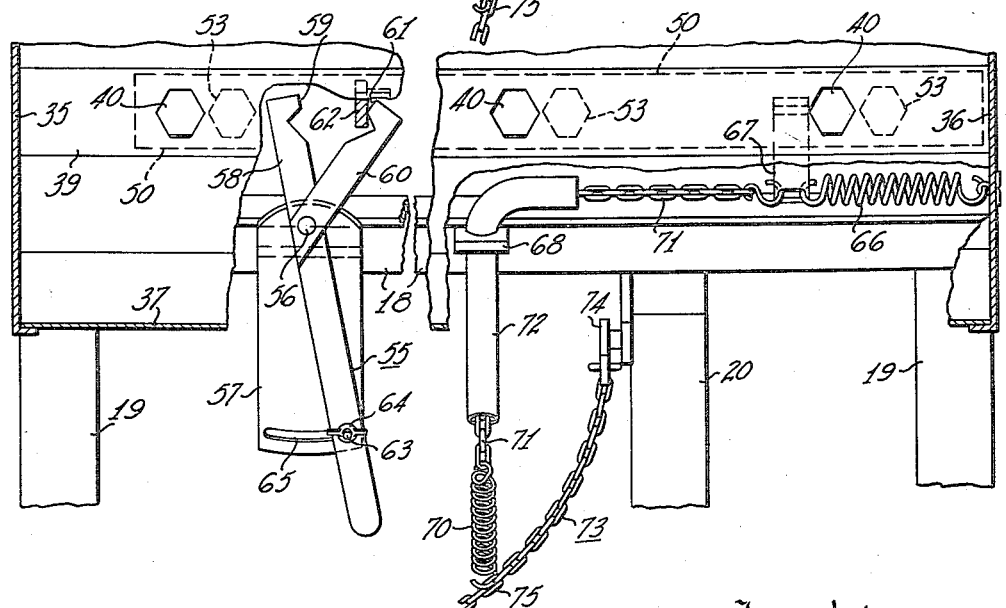
Fig. 4 is a plan view of a portion of the fertilizer distributor when in the raised position shown in Fig. 2 with the hopper valve closed.
Figure 6:
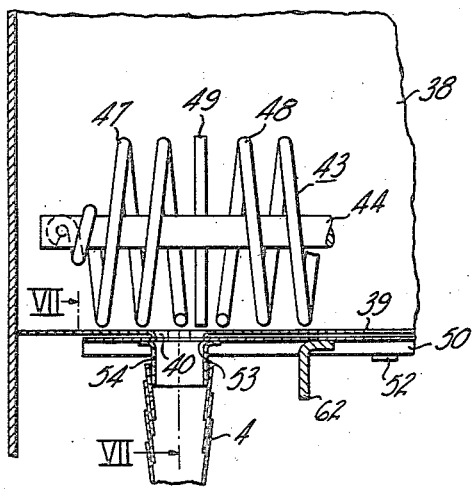
Fig. 6 is a longitudinal sectional view of an end portion of the fertilizer distributor shown in Fig. 1.
Figure 7:
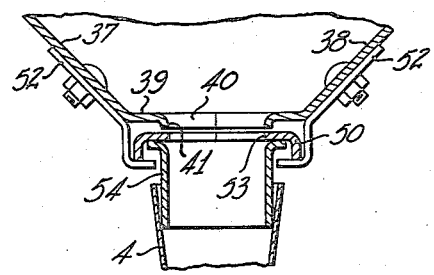
Fig. 7 is a transverse sectional view with portions broken away, taken along lines VII—VII in Fig. 6.
Figure 5:
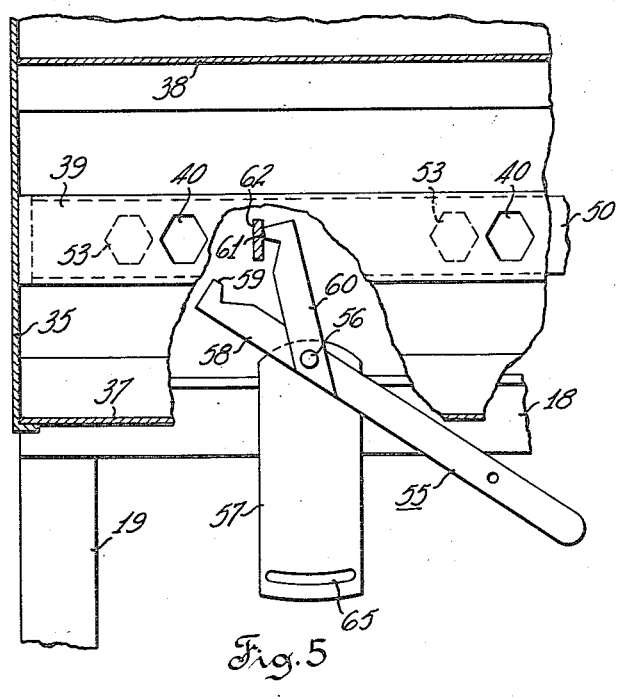
Fig. 5 is a plan view of a portion of the fertilizer distributor shown in Figs. 3 and 4 with the control lever shown released for rocking the slide valve.

A first resilient means is operatively connected between the valve plate 50 and the hopper to urge the valve plate in one direction, to the right, to a normally closed position, Fig. 4, with the openings 53 in the valve plate completely out of alignment or registration with openings 40 in the bottom, as seen in Fig. 4. Such resilient means comprises a tension spring 66 with one end secured to end wall 36 of the hopper and the other end secured to an ear 67 of valve plate 50.

Figure 3:
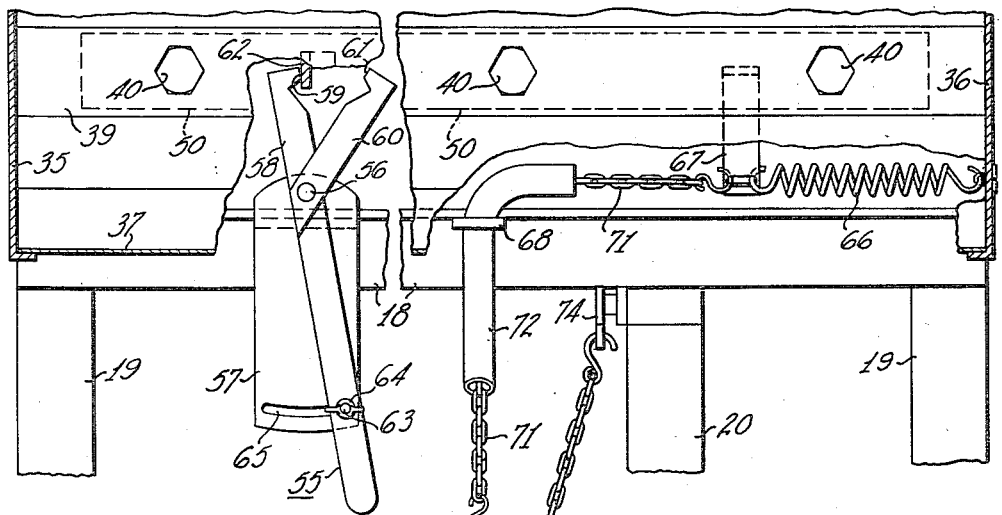
Fig. 3 is a plan view of a portion of the fertilizer distributor, in the lowered position shown in Fig. 1, with the hopper valve open.

Control lever 55 may be locked in selected positions on base plate 57 by means of a bolt 63 extending through an arcuate slot 65 in base plate 57 and through control lever 55 and locked by a wing nut 64, Figs. 3 and 4. With control lever 55 moved to the left, not shown, on base plate 57, the slide valve would be locked in closed position with valve openings 40 and 53 entirely out of registration as shown in Fig. 4.

Stop 59 of control lever 55 may be positioned by moving control lever 55 to the right over arcuate slot 65 to preselect the desired amount of registration of valve openings 40 and 53. As seen in Figs. 3 and 4 control lever 55 is positioned to permit maximum opening of the valve and full registrations of openings 40 and 53. Moving control lever 55 to full open position does not move the valve plate to open position, as seen in Fig. 4, where spring 66 holds the valve closed with the valve plate biased to the right so that flange 62 abuts stop 61. Stops 59 and 61 are spaced to permit limited movement between them so that valve plate 50 can move to the left against stop 59, Fig. 3, when the openings 40 and 53 are in alignment or full registration, and so the valve plate can return to fully closed position with flange 62 abutting stop 61 while the control lever remains in open position.

A second resilient means, Figs. 3 and 4, comprises a spring 70 relatively stronger than spring 66. Spring 70 has one end connected to a flexible tension member or chain 71 which slidably passes through a suitable guide member 72 which may be a pulley but is preferably an elbow conduit rigidly supported on frame member 18 by a plate 68. Chain 71 is connected to ear 67 on valve plate 50. The other end of spring 70 is connected to link 75 intermediate the ends of a throwout chain 73. One end of chain 73 may be secured to a member of frame 8 directly or through a lever arm 74 which may be biased by another spring, not shown, to rotate the lever for tightening chain 73. The other end of chain 73 is connected to hook 27 which is removably hooked over transverse shaft 13 of the power lift arms.

It will be noted, referring to Figs. 1 and 2, that with the distributor in lowered field operating position, the point where chain 73 is attached by hook 27 to the tractor is higher than the point where chain 71 is attached by ear 62 to the valve plate or valve element 50. These attaching points are located in such relation to each other that their relative spacing is greater in the lowered position than the raised position of said distributor relative to said tractor. As a result, when said distributor is moved to a raised position, the distance between the two points decreases, while moving the distributor to a lowered position increases the distance between these two points.

As shown in Fig. 1, when the implement is lowered relative to the tractor, chain 73 becomes taut, tensioning spring 70 an amount so that it is controlling and overcomes spring 66 and causes valve plate 50 to move to the left toward opening position to the preselected degree of registration of openings 40 and 53 as determined by the setting of control lever 55, which, as shown in Fig. 3, is in full open position.

In Figs. 2 and 4 the implement is raised relative to the tractor by the power lift arms vertically swinging the implement about hitch 21, and causing shortening of the distance between hook 27 and the other end of throwout chain 73 where it is connected to the implement frame at lever 74. Throwout chain 72 therefore slackens and releases all tension in spring 70 making it inoperative. Spring 66 then is controlling and urges valve plate 50 to return to closed position, Fig. 4.

Power lift arms 12 and associated lift links 28 are means for raising the implement relative to the tractor, and the second resilient means 70, chains 71, 73 and guide member 72 afford a lost motion connection operatively interposed between the valve element 50 and the tractor so as to urge the valve element to an open position in opposition to the first resilient means when the fertilizer distributor is in a lowered field operation position, Fig. 1, relative to the tractor, and so as to enable said first resilient means 66 to urge said valve element into its closed position when the fertilizer distributor is in a raised position, Fig. 2, relative to the tractor.

And on lowering the implement from the raised position, Figs. 1 and 3, it is seen that the second resilient means is made controlling to move the valve plate in the opposite direction to the limit of stop 59.

Although but one embodiment of the invention has been shown and described, changes and modifications may be made therein without departing from the spirit of the invention or the scope of the appended claims.

It is claimed and desired to secure by Letters Patent:

1. A fertilizer distributor propelled by a tractor, said fertilizer distributor comprising a hopper in up and down adjustable relation to said tractor, a movable valve element for controlling the passage of fertilizer from said hopper, a first resilient means operatively connected between said valve element and said hopper to urge said valve element to a normally closed position, and a lost motion connection including a second resilient means operatively connected to said valve element and said tractor, the attaching points of said lost motion connection on said tractor and valve element being located in such relation to each other that their relative spacing is greater in the lowered position than in the raised position of said distributor relative to said tractor, and so that said lost motion connection urges said valve element to an open position in opposition to said first resilient means when said fertilizer distributor is in a lowered field operating position relative to said tractor, and to enable said first resilient means to urge said valve element into said closed position when said fertilizer distributor is in a raised position relative to said tractor.

2. A tractor mounted fertilizer distributor comprising a hopper in up and down adjustable relation to said tractor, a movable valve element for controlling the passage of fertilizer from said hopper, a first resilient means operatively connected between said valve element and said hopper to urge said valve element to a normally closed position, a movable stop connected to said distributor and cooperating with said valve element for preselecting a limit of opening for said valve element, a lost motion connection including a second resilient means connected to said valve element and said tractor, the attaching points of said lost motion connection on said tractor and valve element being located in such relation to each other that their relative spacing is greater in the lowered position than the raised position of said distributor relative to said tractor, said lost motion connection being operative to overcome said first resilient means and move said valve element against said stop only when said fertilizer distributor is in a lowered field operating position relative to said tractor.

3. A tractor mounted fertilizer distributor comprising a hopper in up and down adjustable relation to said tractor and having a bottom with apertures for the passage of fertilizer therethrough, a valve plate slidably supported relative to said bottom for opening and closing said apertures, a first resilient means operatively connected between said valve plate and said bottom to urge said valve plate to a position normally closing said apertures, a second resilient means connected in load transmitting relation with said tractor, a flexible tension member connected between said second resilient means and said valve plate, and a guide element for said tension member connected with said hopper for movement therewith relative to said tractor; said flexible tension member, guide element and second resilient means being operative to overcome said first resilient means and urge said valve plate to open position when said fertilizer distributor is in a lowered field operating position relative to said tractor and to release said valve plate when said fertilizer distributor is raised relative to said tractor so that said first resilient means will return said valve plate to said normally closed position.

4. A tractor propelled fertilizer distributor of the type supportable selectively in a transport or raised position and in a lowered position relative to said tractor, said distributor comprising a hopper for receiving fertilizer, a bottom for said hopper having openings for distributing said fertilizer, a plate disposed against the lower surface of said bottom, said plate having openings that correspond with said openings in said bottom, said plate supported in slidable relation with said bottom to vary the registration of said openings in said plate with said openings in said bottom to regulate the flow of fertilizer therethrough, a first spring urging said plate lengthwise in one direction to close said openings, a flexible tension member connected at one of its ends with said plate, a guide member mounted on said hopper and cooperable with said tension member so that the latter will move said plate lengthwise in the opposite direction to uncover said openings upon pull at the other end of said tension member in a direction sidewise of said plate, and a second spring connected between said other end of said tension member and said tractor, said second spring being operative to overcome said first spring and urge said plate in said opposite direction only when said fertilizer distributor is in said lowered position.

5. A tractor propelled fertilizer distributor of the type supportable selectively in a transport or raised position and in a lowered position relative to said tractor, said distributor comprising a hopper for receiving fertilizer, a bottom for said hopper having openings for distributing said fertilizer, a plate disposed against the lower surface of said bottom, said plate having openings that correspond with said openings in said bottom, said plate supported in slidable relation with said bottom to vary the registration of said openings in said plate with said openings in said bottom to regulate the flow of fertilizer therethrough, a first spring urging said plate lengthwise in one direction to close said openings, a stop for selecting the limit of movement of said plate in the opposite direction to preselect the degree of registration of said plate openings with said bottom openings, a flexible tension member connected at one of its ends with said plate, a guide member mounted on said hopper and cooperable with said tension member so that the latter will move said plate lengthwise in the opposite direction to uncover said openings upon pull at the other end of said tension member in a direction sidewise of said plate, and a second spring connected between said other end of said tension member and said tractor, said second spring being operative when said fertilizer distributor is in said lowered position to overcome said first spring and urge said plate in said opposite and opening direction to the limit of said stop, and said second spring being inoperative when said fertilizer distributor is in said raised position so that said first spring remains effective to urge said plate in said closing direction.

References Cited in the file of this patent
UNITED STATES PATENTS

| | | |
|---|---|---|
| 2,410,937 | Harder | Nov. 12, 1946 |
| 2,687,307 | Austermiller | Aug. 24, 1954 |